United States Patent
Wang et al.

(10) Patent No.: US 10,771,726 B2
(45) Date of Patent: Sep. 8, 2020

(54) IMAGE TRANSMISSION DEVICE AND METHOD INCLUDING AN IMAGE DATA RECEIVER AND A PROCESSOR

(71) Applicant: TuSimple, Inc., San Diego, CA (US)

(72) Inventors: Ming Wang, Beijing (CN); Jie Sun, Beijing (CN)

(73) Assignee: TUSIMPLE, INC., San Diego, CA (US)

( * ) Notice: Subject to any disclaimer, the term of this patent is extended or adjusted under 35 U.S.C. 154(b) by 43 days.

(21) Appl. No.: 15/932,705

(22) Filed: Apr. 10, 2018

(65) Prior Publication Data

US 2018/0295311 A1 Oct. 11, 2018

(30) Foreign Application Priority Data

Apr. 11, 2017 (CN) .......................... 2017 1 0231384

(51) Int. Cl.
*H04N 5/38* (2006.01)
*H04N 1/00* (2006.01)
*H04N 5/44* (2011.01)

(52) U.S. Cl.
CPC ........... *H04N 5/38* (2013.01); *H04N 1/00095* (2013.01); *H04N 1/00108* (2013.01); *H04N 1/00114* (2013.01); *H04N 1/00124* (2013.01); *H04N 1/00137* (2013.01); *H04N 5/44* (2013.01)

(58) Field of Classification Search
CPC .......... H04N 5/38; H04N 5/44; H04N 5/4401; H04N 1/00095; H04N 1/00098; H04N 1/00108; H04N 1/00124; H04N 1/00137
See application file for complete search history.

(56) References Cited

U.S. PATENT DOCUMENTS

| | | | | |
|---|---|---|---|---|
| 8,560,753 | B1* | 10/2013 | Hobbs | G06F 3/1454 345/2.1 |
| 9,491,333 | B2* | 11/2016 | Ubik | H04N 5/04 |
| 9,967,599 | B2* | 5/2018 | Qu | H04N 21/2353 |
| 2001/0009419 | A1* | 7/2001 | Ikeno | H04N 19/164 345/555 |
| 2012/0050613 | A1* | 3/2012 | Halna Du Fretay | G06F 3/1438 348/513 |
| 2014/0092211 | A1* | 4/2014 | Nakajima | H04N 5/04 348/43 |
| 2015/0264358 | A1* | 9/2015 | Moriya | H04N 19/174 375/240.02 |

FOREIGN PATENT DOCUMENTS

| CN | 101860738 A | 10/2010 |
|---|---|---|
| CN | 104735448 A | 6/2015 |

* cited by examiner

*Primary Examiner* — Ngoc Yen T Vu
(74) *Attorney, Agent, or Firm* — Paul Liu; Perkins Coie LLP

(57) ABSTRACT

The present application discloses an image transmission device and method. The image transmission device includes a receiver configured to receive pixel data in image data from a camera in sequence and buffer the pixel data into a memory, and determine, upon reception of a line of pixel data, a line number of the line of pixel data in the image data and a frame number of the image data; and a processor configured to obtain the line of pixel data, the line number of the line of pixel data and the frame number of the image data from the receiver, package the obtained line of pixel data, line number of the line of pixel data and frame number of the image data into a data packet, and transmit the data packet to a server.

20 Claims, 5 Drawing Sheets

IMAGE TRANSMISSION DEVICE AND METHOD INCLUDING AN IMAGE DATA RECEIVER AND A PROCESSOR

CROSS-REFERENCES TO RELATED APPLICATIONS

The present application claims the priority from Chinese Patent Application No. 201710231384.1, filed with the Chinese Patent Office on Apr. 11, 2017 and entitled "Image Transmission Device and Method", which is hereby incorporated by reference in its entirety.

FIELD OF INVENTION

The present application relates to the computer field and particularly to an image transmission device and an image transmission method.

BACKGROUND

At present, the mode of transmitting the image data is mainly as follows: the image processing system receives a whole image data frame from the video camera and buffers it, and then transmits this image data frame to a server after processing and compressing it.

This mode of transmitting the image data has a longer delay. Take as an example that an image data frame at the resolution of 1024*768 is transmitted by the gigabit network (i.e., 1000 Mbps), where each pixel datum occupies 24 bits, the size of one image data frame is 1024*768*24 bits, and the delay consumed by transmitting this image data frame is 1024*768*24/1000, which is about 18 ms. That is, the transmission delay of one image data frame is 18 ms, which will be a fatal problem for the application scenario with a higher requirement for the real-time performance of image data transmission or for the application scenario where the image processing algorithm is time-consuming, such as data collection, automatic drive or another application scenario.

BRIEF SUMMARY

The present application provides an image transmission device and method.

At an aspect, an embodiment of the present application provides an image transmission device, which includes a Field-Programmable Gate Array (FPGA) and a processor, wherein:

the FPGA configured to receive pixel data in image data from a video camera in sequence and buffer the pixel data into a memory, and determine, upon reception of a line of pixel data, a line number of the line of pixel data in the image data and a frame number of the image data; and, the processor configured to obtain the line of pixel data, the line number of the line of pixel data and the frame number of the image data from the FPGA, package the obtained line of pixel data, line number of the line of pixel data and frame number of the image data into a data packet, and transmit the data packet to a server.

At another aspect, an embodiment of the present application provides an image transmission method, which comprises:

receiving, by an image transmission device, pixel data of an image from a video camera in sequence and buffering the pixel data into a memory; determining, upon reception of a line of pixel data, a line number of the line of pixel data in the image data and a frame number of the image data; and, packaging the line of pixel data, the line number of the line of pixel data and the frame number of the image data into a data packet, and transmitting the data packet to a server.

BRIEF DESCRIPTION OF THE DRAWINGS

The accompanying drawings are used to provide the further understanding of the present application and constitute a part of the specification, and serve to explain the present application together with the embodiments of the present application but not limit the present application.

DETAILED DESCRIPTION OF THE EMBODIMENTS

In order to make those skilled in the art better understand the technical solution in the present application, the technical solution in the embodiments of the present application will be described clearly and completely below in combination with the accompanying drawings. Obviously the described embodiments are just a part of the embodiments of the present application but not all the embodiments. Based upon the embodiments of the present application, all of other embodiments obtained by those ordinary skilled in the art without creative work should pertain to the protection scope of the present application.

First Embodiment

In the embodiments of the present application, an image transmission device connects to a camera and a server in a wired or wireless way, and transmits timely image data frames collected by the video camera to the server. Specifically, the image transmission device receives the image data frame one by one from the camera in the wired or wireless way, and in the process of receiving each pixel datum of an image data frame, determines, upon reception of a line of pixel data, the frame number of the image data frame including the line of pixel data and the line number of the line of pixel data; then packages the line of pixel data, the line number of the line of pixel data and the frame number into a data packet, and transmits the data packet to the server.

Figure 1:
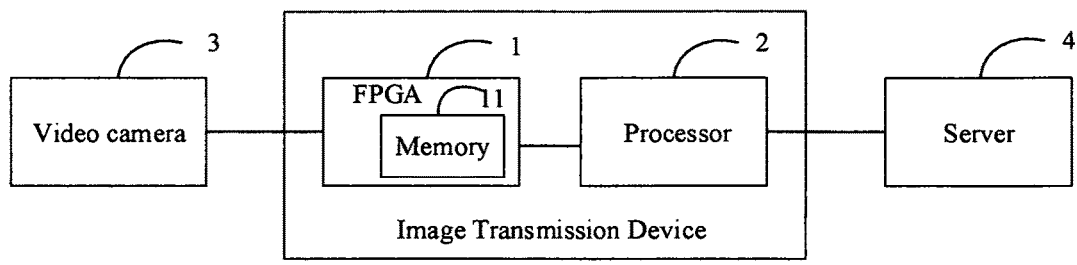
FIG. 1 is one of structural schematic diagrams of the image transmission device in an embodiment of the present application.

Referring to FIG. 1 which is a structural schematic diagram of the image transmission device in an embodiment of the present application, the device includes an FPGA 1 and a processor 2, where the FPGA 1 and the processor 2 could be two separate components or could be integrated into an overall processor (e.g., ZYNQ7020 processor), which is not limited strictly in the present application.

The FPGA 1 is configured to receive pixel data in image data from a video camera 3 in sequence and buffer the pixel data into a memory, and determine, upon reception of a line of pixel data, a line number of the line of pixel data in the image data and a frame number of the image data.

The processor 2 is configured to obtain the line of pixel data, the line number of the line of pixel data and the frame number of the image data from the FPGA 1, package the obtained line of pixel data, line number of the line of pixel data and frame number of the image data into a data packet, and transmit the data packet to a server 4.

In order to improve the real-time performance of the image transmission, in an embodiment of the present application, after each time the FPGA 1 received a line of pixel data, the FPGA 1 generates reading indication information to indicate the processor 2 to read the line of pixel data, for transmitting timely the line of pixel data to the server 4 by the processor 2; the processor 2 obtains the line of pixel data, the line number of the line of pixel data and the frame number of the image data from the FPGA 1 according to the reading indication information. Specifically a variety of embodiments can be implemented. For example, the FPGA 1 may send the generated reading indication information to the processor 2, and the processor 2 transmits timely the line of pixel data received by the FPGA 1 to the server; or the processor 2 may poll the FPGA 1 periodically, and once it is detected that the FPGA 1 generates the reading indication information then the processor 2 transmits timely the line of pixel data received by the FPGA 1 to the server. In an embodiment of the present application, the reading indication information can be represented by a numerical value (e.g., 1 or 0 or the like), or can be represented by a character (e.g., represented by e), or can be represented by a character string (e.g., end), or can be an interrupt signal, which is not limited strictly in the present application.

Therefore, in the device as shown in FIG. 1 described above, upon an end of receiving of a line of pixel data, the FPGA 1 is further configured to generate reading indication information reading the line of pixel data; the processor 2 obtains the line of pixel data, the line number of the line of pixel data and the frame number of the image data from the FPGA 1, which is specifically configured to: obtain the reading indication information and obtain the line of pixel data, the line number of the line of pixel data and the frame number of the image data from the FPGA 1 according to the reading indication information. The specific implementations can include but not limit to the four modes as below:

First mode: the FPGA 1 buffers correlatively the line of pixel data, the line number of the line of pixel data and the frame number of the image data into a fixed address preset in the memory 11; the FPGA 1 is further configured to: send the reading indication information to the processor 2; the processor 2 obtains the line of pixel data, the line number of the line of pixel data and the frame number of the image data from the FPGA 1, which is specifically configured: upon reception of the reading indication information, to read the line of pixel data, the line number of the line of pixel data and the frame number of the image data from the fixed address of the memory 11.

In an embodiment of the present application, the reading indication information in the first mode described above being an interrupt signal is taken as an example, where the FPGA 1 and the processor 2 can pre-agree on a private protocol. For example: in the process of receiving the pixel data, the FPGA 1 buffers, upon reception of a pixel datum, the pixel datum into a fixed address preset in the memory 11, and determines, upon reception of a line of pixel data, the line number of the line of pixel data and the frame number of the image data including the line of pixel data, and stores the line number of the line of pixel data and the frame number of the image data into the fixed address; the FPGA 1 sends an interrupt signal to the processor 2; the processor 2 determines, upon reception of an interrupt signal, that the FPGA 1 has received a line of pixel data, and automatically reads the line of pixel data, the line number of the line of pixel data and the frame number of the image data from the fixed address of the memory 11 according to the protocol, and packages the obtained line of pixel data, line number of the line of pixel data and frame number of the image data into a data packet.

Figure 2:
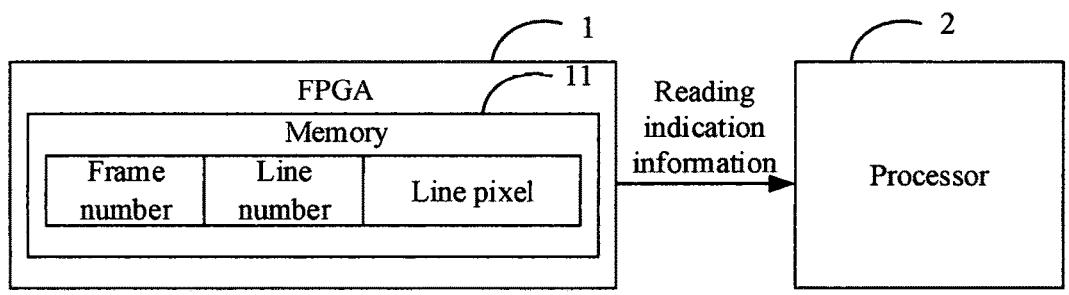
FIG. 2 is one of schematic diagrams of obtaining by the processor a line of pixel data, the line number of the line of pixel data and the frame number of the image data from the FPGA in an embodiment of the present application.

For example, the storage space corresponding to the fixed address can be preset to include a plurality of fields: a field for storing the frame number of the image data, a field for storing the line number of the line of pixel data, and a field for storing the line of pixel data. The order of these three fields can be set flexibly according to the actual requirements, which is not limited strictly by the present application. As shown in FIG. 2, the order of these three fields is as follows: the field for storing the frame number of the image data frame, the field for storing the line number of the line of pixel data, and the field for storing the line of pixel data.

Second mode: the FPGA 1 buffers correlatively the line of pixel data, the line number of the line of pixel data and the frame number of the image data into a fixed address preset in the memory 11; the FPGA 1 is further configured to: butter the reading indication information into the fixed address; the processor 2 obtains the line of pixel data, the line number of the line of pixel data and the frame number of the image data from the FPGA 1, which is specifically configured to: poll the fixed address of the memory 11 at a preset time cycle, and upon detection of the reading indication information, read the line of pixel data, the line number of the line of pixel data and the frame number of the image data from the fixed address of the memory 11.

Figure 3:
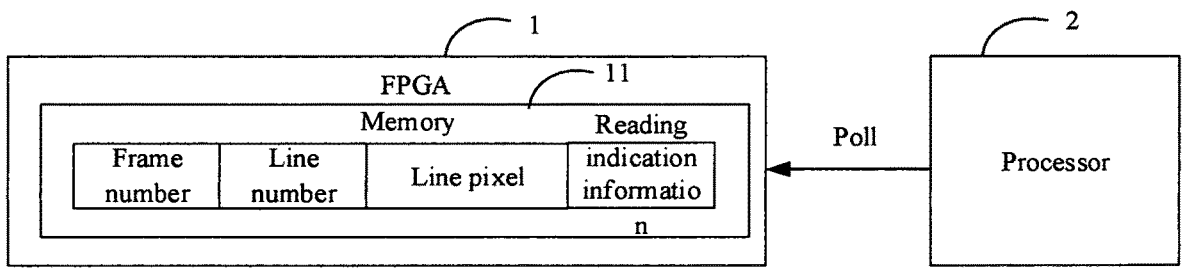
FIG. 3 is the second one of the schematic diagrams of obtaining by the processor a line of pixel data, the line number of the line of pixel data and the frame number of the image data from the FPGA in an embodiment of the present application.

For example, the storage space corresponding to the fixed address can be pre-divided into a plurality of field spaces: a field for storing the frame number of the image data frame, a field for storing the line number of the line of pixel data, a field for storing the line of pixel data, and a field for storing the reading indication information. The order of these four fields can be set flexibly according to the actual requirements, which is not limited strictly by the present application. As shown in FIG. 3, the order of these four fields is as follows: the field for storing the frame number of the image data, the field for storing the line number of the line of pixel data, the field for storing the line of pixel data, and the field for storing the reading indication information.

In order to further improve the real-time performance of the transmission of a line of pixel data, in the second mode described above and in the polling mechanism of the processor 2, the time cycle is less than or equal to the time duration during which the FPGA 1 receives a line of pixel data from the video camera 3.

Figure 4:
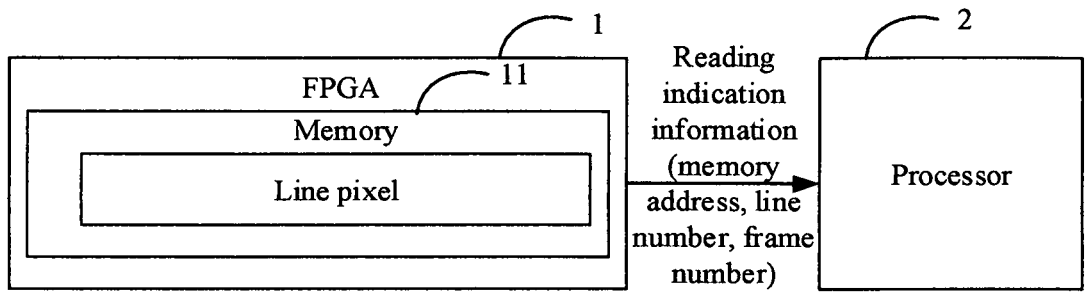
FIG. 4 is the third one of the schematic diagrams of obtaining by the processor a line of pixel data, the line number of the line of pixel data and the frame number of the image data from the FPGA in an embodiment of the present application.

Third mode: the reading indication information contains the line number of the line of pixel data, the frame number of the image data, and a memory address buffering the line of pixel data; and the FPGA 1 is further configured to: send the reading indication information to the processor 2; the processor 2 obtains the line of pixel data, the line number of the line of pixel data and the frame number of the image data from the FPGA 1, which is specifically configured to: obtain the line number of the line of pixel data and the frame number of the image data from the reading indication information; and read the line of pixel data from the memory 11 according to the memory address in the reading indication information. As shown in FIG. 4.

Fourth mode: the reading indication information contains a memory address storing the line of pixel data, the line number of the line of pixel data and the frame number of the image data; the FPGA 1 is further configured to: store the determined line number of the line of pixel data and frame number of the image data into the memory 11, and send the reading indication information to the processor 2; the processor 2 obtains the line of pixel data, the line number of the line of pixel data and the frame number of the image data from the FPGA 1, which is specifically configured to: read the line of pixel data, the line number of the line of pixel data and the frame number of the image data from the memory 11 according to the memory address in the reading indication information.

Figure 5:
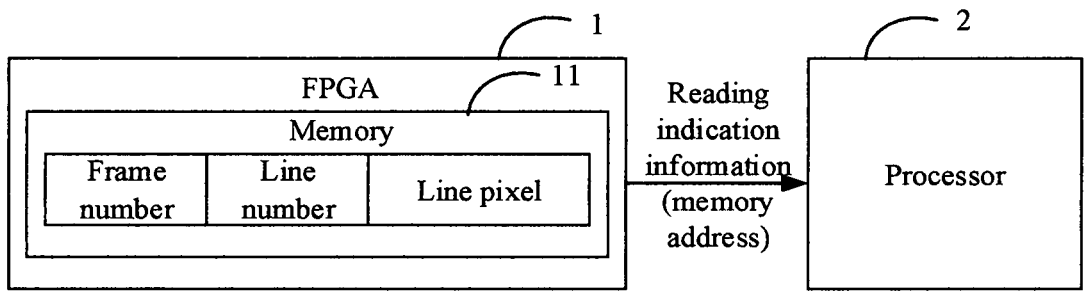
FIG. 5 is the fourth one of the schematic diagrams of obtaining by the processor a line of pixel data, the line number of the line of pixel data and the frame number of the image data from the FPGA in an embodiment of the present application.

For example, the storage space corresponding to the fixed address can be preset to be a plurality of field spaces: a field for storing the frame number of the image data, a field for storing the line number of the line of pixel data, and a field for storing the line of pixel data. The order of these three fields can be set flexibly according to the actual requirements, which is not limited strictly by the present application. As shown in FIG. 5, the order of these three fields is as follows: the field for storing the frame number of the image data, the field for storing the line number of the line of pixel data, and the field for storing the line of pixel data.

In order to avoid the abnormity of the video camera and errors caused by which in the image data received from the video camera, so as to further ensure the accuracy of the image transmission, in an embodiment of the present application, upon reception of a line of pixel data, the FPGA 1 further determines the amount k of the line of pixel data, and determines whether the video camera 3 is abnormal according to the amount k of the line of pixel data and a numerical value m for representing the number of pixel data contained in each line of the image data in size of the image data frame; and generates report information of video camera abnormity and send it to the processor 2 when determining the video camera 3 is abnormal; the processor 2 is further configured to send the received report information of video camera abnormity to the server 4.

The FPGA 1 determines whether the video camera 3 is abnormal according to k and m through but not limited to the two modes as below:

First mode: calculating an absolute value of a difference between the pixel amount k and the numerical value m, |k−m|, and determining the video camera 3 is abnormal if the absolute value is higher than a preset number threshold; otherwise, determining the video camera 3 is normal if the absolute value is lower than or equal to the number threshold.

Second mode: calculating a ratio of the pixel amount k to the numerical value m, k/m, and determining the video camera 3 is abnormal if the ratio is higher than a first preset ratio threshold b1 or the ratio is lower than a second preset ratio threshold b2, wherein b1 is a numerical value greater than 1 and b2 is a numerical value less than 1.

Figure 6:
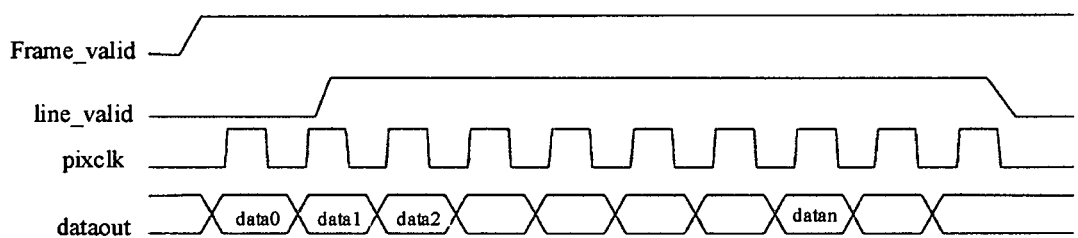
FIG. 6 is a timing diagram of transmitting by the video camera the image data to the FPGA in an embodiment of the present application.

In order to further ensure accuracy and orderliness of receiving image pixels by FPGA 1 from the video camera 3, in an embodiment of the present application, when transmitting the image to the FPGA 1, the video camera 3 transmits three time sequences to the FPGA 1 sequence: one is a frame time sequence (represented as frame_valid below) for representing the start of transmitting an image data frame (referred as the current image data frame below) to the FPGA 1, one is a line time sequence (represented as line_valid below) for representing the start of transmitting a line of pixel data (referred as the current line of pixel data below) in the current image data frame to the FPGA 1, and one is a pixel time sequence (represented as pixclk below) for representing the transmission of each pixel datum in the current line to the FPGA 1. As shown in FIG. 2, it is assumed that the size of the current image data frame is n*m (that is, the current image data frame contains m rows and n columns of pixels), the effective time duration of one frame time sequence is T1, the effective time duration of one line time sequence is T2, and the effective time duration of one pixel time sequence is T3, thus T1>m*T2>m*n*T3. The data output time sequence is dataout in which the FPGA 1 stores the received pixel data into the memory 11. The various time sequences are as shown in FIG. 6. In an embodiment of the present application, the effective time duration T3 of the pixel time sequence can be set according to the time duration T during which the FPGA 1 receives one pixel data from the video camera 3 in a general case, for example, T3 is greater than or equal to t; the effective time duration T2 of the line time sequence can be set according to the number n of columns of the current image data frame and the effective time duration T3 of the pixel time sequence, for example, T2 is greater than n*T3; and the effective time duration T1 of the frame time sequence can be set according to the number m of rows of the current image data frame and the effective time duration T2 of the line time sequence, for example, T1 is greater than m*T2.

Accordingly, in an embodiment of the present application, the FPGA 1 detects whether the video camera 3 sends the frame time sequence, the line time sequence and the pixel time sequence in sequence, so as to receive each line of pixel data of a certain image data frame from the video camera 3 in sequence.

Therefore, in an embodiment of the present application, the FPGA 1 receives the pixel data of the image data from the video camera 3 in sequence, which is specifically configured to: when detecting a frame time sequence, sent by the video camera 3, for representing the start of transmitting a current image data frame, detect a line time sequence, sent by the video camera 3, for representing the transmission of a current line of pixel data of the current image data frame; when both the frame time sequence and the line time sequence are valid, receive the current line of pixel data in the image data in sequence according to a pixel time sequence transmitted by the video camera 3 until confirming the end of receiving the current line of pixel data when the line time sequence is invalid, and continue to detect a next line time sequence, sent by the video camera 3, for representing the start of transmitting a next line of pixel data of the current image data frame; and so on until confirming the end of receiving the current image data frame when the frame time sequence is invalid, and continue to detect a next frame time sequence, sent by the video camera 3, for representing a start of transmitting a next image data frame.

Preferably, in order to further improve the accuracy of the FPGA 1 confirming the line number of the received line of pixel data in the image data and the frame number of the image data, in an embodiment of the present application, the FPGA 1 presets three counters: one is a frame counter for calculating the number of the frame time sequences received from the video camera 3, where the frame counter is incremented by 1 each time one frame time sequence is received; one is a line counter for calculating the number of the line time sequences received from the video camera 3 during the effective time duration of one frame time sequence, where the line counter is incremented by 1 each time one line time sequence is received, and the count of the line counter represents the total number of the lines contained in the current image data frame at this time if the current frame time sequence is invalid, wherein the line counter is reset when the FPGA 1 receives a next frame time sequence from the video camera 3; and one is a pixel counter for calculating the number of the pixel data received from the video camera 3 during the effective time duration of one line time sequence, where the pixel counter is incremented by 1 each time one pixel datum is received, and the count of the pixel counter represents the total number of the pixel data contained in the current line at this time if the current line time sequence is invalid, wherein the pixel counter is reset when the FPGA 1 receives a next line time sequence from the video camera 3.

The aforementioned FPGA 1 determines, upon reception of the line of pixel data, the line number of the line of pixel data in the image data and the frame number of the image data, which is specifically configured to: determine, upon reception of the current line of pixel data, the count of the frame counter at this time to be the frame number of the image data, and the count of the line counter to be the line number of the line of pixel data.

Figure 7:
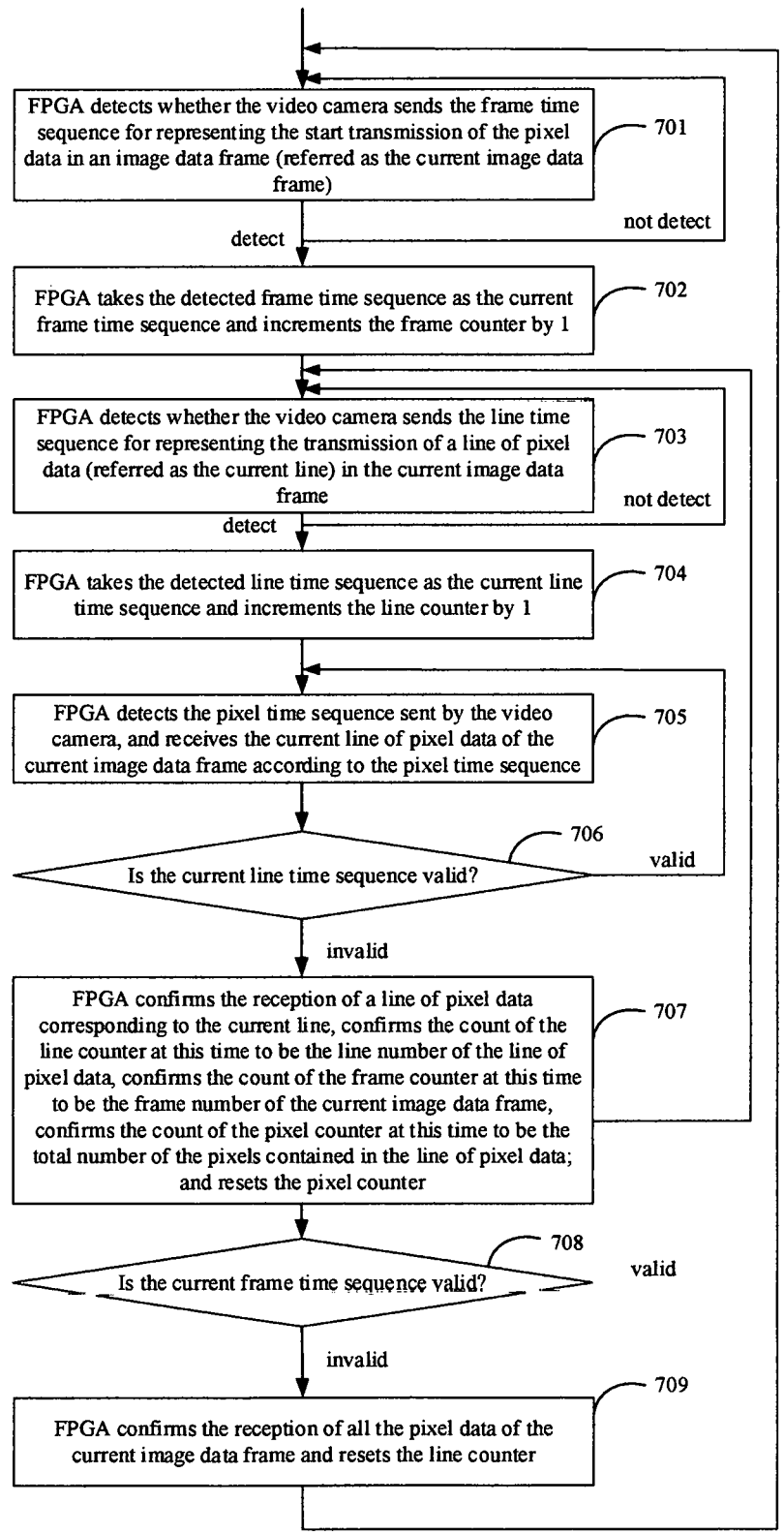
FIG. 7 is a flow chart of a method of receiving by the FPGA the image data from the video camera in an embodiment of the present application.

Specifically, the aforementioned processes operated by FPGA 1, where receiving the pixel data of the image from the video camera 3 in sequence and determining, upon reception of a line of pixel data, the line number of the line of pixel data, the frame number of the image data and the total number of the pixels contained in the line of pixel data, can be implemented by the method flow as shown in FIG. 7, which includes:

Step 701: the FPGA detects whether the video camera sends the frame time sequence for representing the start of transmitting the pixel data in an image data frame (referred as the current image data frame). If the frame time sequence is detected, then proceed to Step 702, otherwise the detection continues.

Step 702: the FPGA takes the detected frame time sequence as the current frame time sequence and increments the frame counter by 1.

Step 703: the FPGA detects whether the video camera sends the line time sequence for representing the transmission of a line of pixel data (referred as the current line) in the current image data frame. If the line time sequence is detected, then proceed to Step 704, otherwise the detection continues.

Step 704: the FPGA takes the detected line time sequence as the current line time sequence and increments the line counter by 1.

Step 705: the FPGA detects the pixel time sequence sent by the video camera, and receives the current line of pixel data of the current image data frame according to the pixel time sequence.

Step 706: the FPGA judges whether the current line time sequence is valid. If it is valid, then proceed to Step 705, otherwise proceed to Step 707.

Step 707: the FPGA confirms the reception of a line of pixel data corresponding to the current line, confirms the count of the line counter at this time to be the line number of the line of pixel data, confirms the count of the frame counter at this time to be the frame number of the current image data frame, confirms the count of the pixel counter at this time to be the total number of the pixels contained in the line of pixel data; and resets the pixel counter.

Step 708: the FPGA judges whether the current frame time sequence is valid. If it is valid, then proceed to Step 703, otherwise proceed to Step 709.

Step 709: the FPGA confirms the reception of all the pixel data of the current image data frame and resets the line counter. Then proceed to Step 701.

Figure 8:
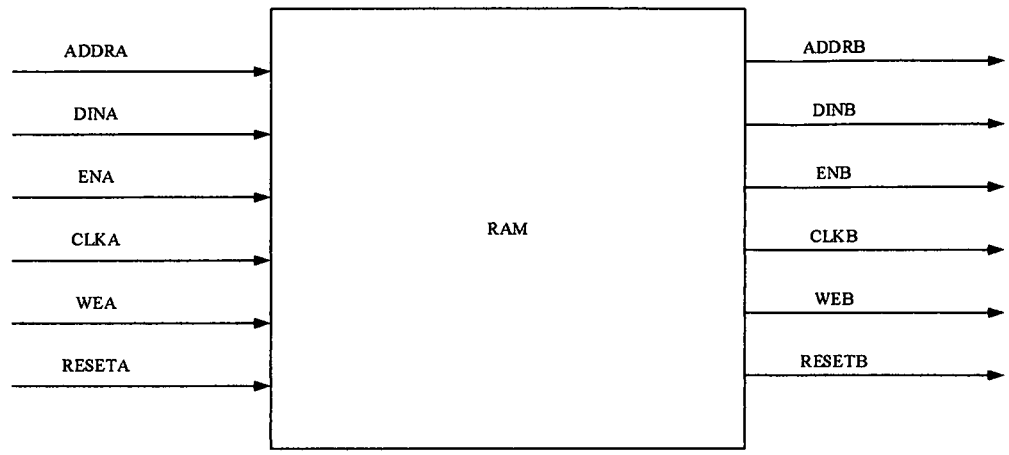
FIG. 8 is a schematic diagram of ports of the RAM in an embodiment of the present application.

In an embodiment of the present application, the memory 11 can be a random access memory (i.e., RAM) in the FPGA 1. The RAM operates in the two-port two-way eight bit mode and contains a port A and a port B, wherein the FPGA 1 writes data into the RAM via the port A, the processor 2 reads data from the RAM via the port B, and the clock at which the FPGA 1 writes data into the RAM may different from the clock at which the processor 2 reads data from the RAM. The clock at which the FPGA 1 writes data into the RAM depends on the pixel output clock of the video camera 3, and the clock at which the processor 2 reads data from the RAM depends on the processing clock of the processor 2. The structural schematic diagram of the two-port two-way mode of the RAM is as shown in FIG. 8. The port A includes the following signals in sequence: ADDRA (an address signal, representing the memory address of the data to be written in the RAM), DINA (a data signal, representing the value of the data to be written), ENA (a state signal, where 1 represents a state of writing data and 0 represents a state of non-writing data), CLKA (a clock signal, representing the clock at which data is written into the RAM), WEA (a bit signal) and RESTA (a reset signal); and the port B includes the following signals in sequence: ADDRB (an address signal, representing the memory address of the data to be read in the RAM), DINB (a data signal, representing the value of the data to be read), ENB (a state signal, where 1 represents a state of reading data and 0 represents a state of non-reading data), CLKB (a clock signal, representing the clock at which data is read from the RAM), WEB (a bit signal) and RESTB (a reset signal).

Figure 9:
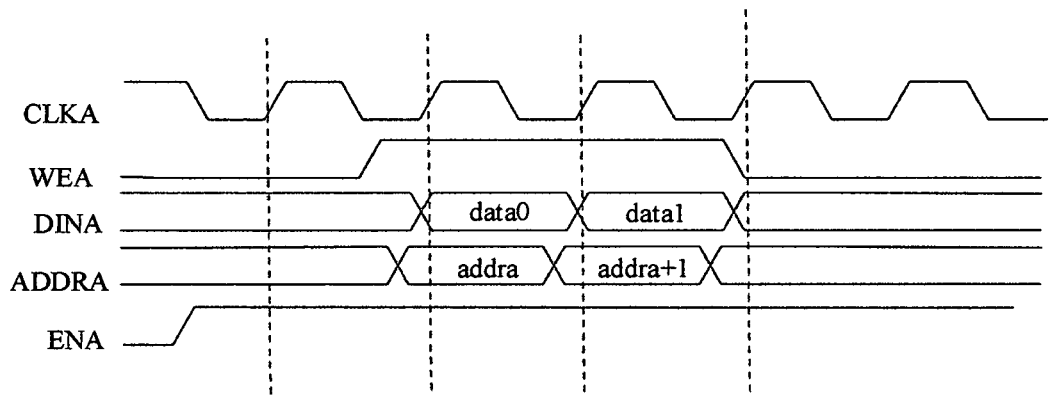
FIG. 9 is a timing diagram of writing data from the port A of the RAM in an embodiment of the present application.

The FPGA 1 generates the data writing time sequence of the RAM according to the line time sequence and the pixel time sequence of the video camera 3, that is, synchronizes the pixel time sequence with the CLKA clock (i.e., dataout clock), and writes the reading indication information 1 into the fixed address of the RAM after writing a line of pixel data, which indicates that the writing work of the line of pixel data is completed. The time sequences related to the signals of the port A are as shown in FIG. 9.

Figure 10:
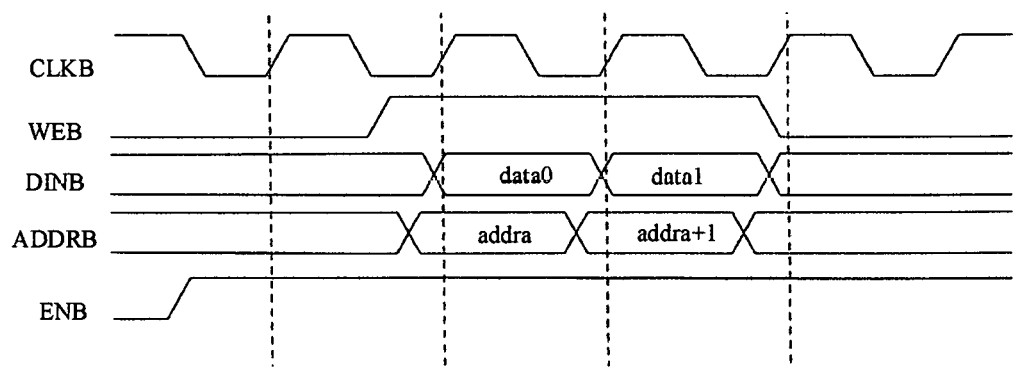
FIG. 10 is a timing diagram of reading data from the port B of the RAM in an embodiment of the present application.

The processor 2 polls the fixed address of the RAM, and starts to read a line of pixels from the fixed address of the RAM when the reading indication information 1 is detected. The time sequences in which the processor 2 reads data from the port B are as shown in FIG. 10.

Figure 11:
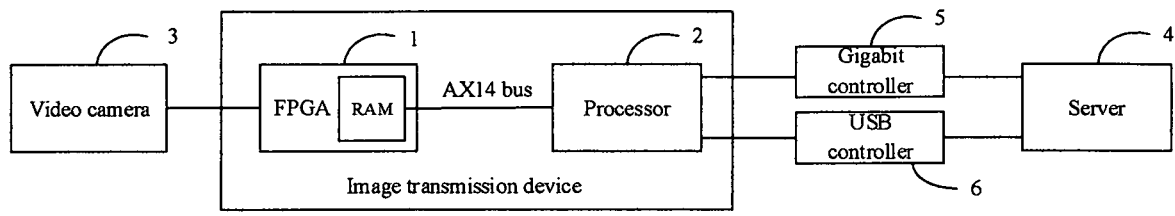
FIG. 11 is the second one of the structural schematic diagrams of the image transmission device in an embodiment of the present application.

In an embodiment of the present application, the processor 2 can transmit the data packet to the server 4 by a gigabit-network controller 5, or can transmit the data packet to the server 4 by a USB controller 6. In an embodiment of the present application, the processor 2 can also access the RAM via the AX14 bus interface. As shown in FIG. 11.

Second Embodiment

Figure 12:
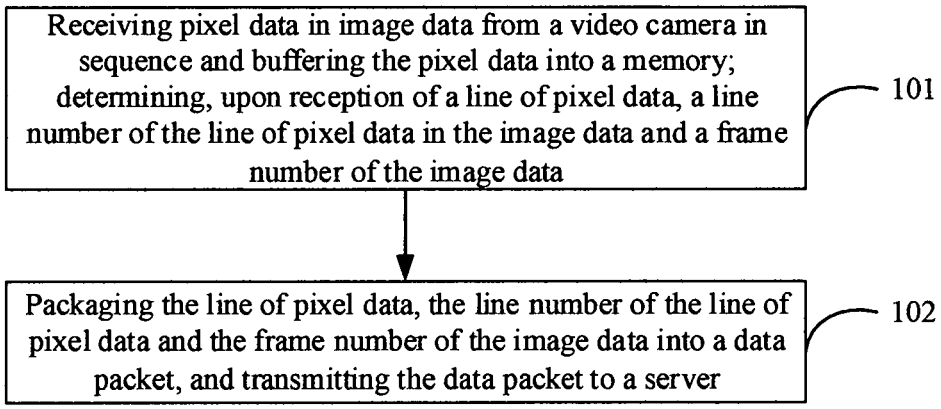
FIG. 12 is a flow chart of an image transmission method in an embodiment of the present application.

Accordingly, an embodiment of the present application further provides an image transmission method. The method flow is as shown in FIG. 12, and the method includes:

Step 101: receiving pixel data in image data from a video camera in sequence and buffering the pixel data into a memory; determining, upon reception of a line of pixel data, a line number of the line of pixel data in the image data and a frame number of the image data;

Step 102: packaging the line of pixel data, the line number of the line of pixel data and the frame number of the image data into a data packet, and transmitting the data packet to a server.

In the technical solution of the present application, on the one hand, in the process of receiving the pixel data in the image data from the video camera 3 in sequence, when the FPGA receives a line of pixel data, the processor packages the line of pixel data and transmits it to the server in time, so as to achieve the purpose of both receiving and transmitting. Comparing with the transmission mode provided in the prior art, in the technical solution of the present application, the transmission delay of only one line of pixel data is consumed by each transmission of one image data frame to the server, and there is no need of uniform transmission after waiting for the reception of all the pixel data of one image data frame, thus improve the real-time performance of image transmission. Take as an example that an image data frame at the resolution of 1024*768 is transmitted by the gigabit network (i.e., 1000 Mbps), by implementing the technical solution of the present application, the delay required by transmitting the image data frame is 1024*768*24/(1000*768), which is about 2.3 us. The delay of transmitting the image data is reduced and the real-time performance of image data transmission is improved comparing with 18 ms which is the delay of transmitting the image data of the same size under the same network environment in the prior art. On the other hand, in the technical solution of the present application, when a line of pixel data is transmitted to the server, the frame number of the image data frame including the line of pixel data and the line number of the line of pixel data in the image data frame are further marked, in order to enable the server to know that the received line of pixel data is which line of pixel data of which image data frame to thereby ensure the accuracy of the image data transmission. From the above, with the technical solution of the present application, the purpose of ensuring the accuracy of image data transmission and at the same time improving the real-time performance of image data transmission is achieved.

It should be understood by those skilled in the art that the embodiments of the present application can provide methods, systems and computer program products. Thus the present application can take the form of hardware embodiments alone, application software embodiments alone, or embodiments combining the application software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the present application have been described, those skilled in the art can make additional alterations and modifications to these embodiments once they learn about the basic creative concepts. Thus the attached claims are intended to be interpreted to include the preferred embodiments as well as all the alterations and modifications falling within the scope of the present application.

Evidently those skilled in the art can make various modifications and variations to the present application without departing from the spirit and scope of the present application. Thus the present application is also intended to encompass these modifications and variations therein as long as these modifications and variations to the present application come into the scope of the claims of the present application and their equivalents.

What is claimed is:

1. An image transmission device comprising a receiver and a processor, wherein:
the receiver is configured to:
receive pixel data in image data from a camera in sequence and buffer the pixel data into a memory, and
determine, upon reception of a line of pixel data, a line number of the line of pixel data in the image data, and a frame number of the image data, buffer correlatively the line of pixel data, the line number of the line of pixel data, and the frame number of the image data into a preset location in the memory, generate, upon reception of the line of pixel data, reading indication information that indicates that the line of pixel data is available to be read; and the processor is configured to:

perform an obtain operation in which the line of pixel data, the line number of the line of pixel data, and the frame number of the image data are obtained from the receiver, wherein the processor is configured to perform the obtain operation by being configured to: obtain the reading indication information, and read the line of pixel data, the line number of the line of pixel data, and the frame number of the image data from the preset location of the memory according to the reading indication information, package the obtained line of pixel data, line number of the line of pixel data, and frame number of the image data into a data packet, and transmit the data packet to a server.

2. The device according to claim 1, wherein the receiver is further configured to: send the reading indication information to the processor.

3. The device according to claim 1, wherein the receiver is further configured to: buffer the reading indication information into the preset location; and wherein the processor is configured to: poll the preset location of the memory at a preset time cycle.

4. The device according to claim 1, wherein the reading indication information includes the line number of the line of pixel data, the frame number of the image data, and a memory location buffering the line of pixel data;

the receiver is further configured to: send the reading indication information to the processor;

wherein the processor is configured to: obtain the line number of the line of pixel data, and the frame number of the image data from the reading indication information; and read the line of pixel data from the memory according to the memory location in the reading indication information.

5. The device according to claim 1, wherein the reading indication information includes a memory location buffering the line of pixel data, the line number of the line of pixel data, and the frame number of the image data;

wherein the receiver is further configured to: buffer the line number of the line of pixel data and frame number of the image data into the memory, and send the reading indication information to the processor; and, wherein the processor is configured to: read the line of pixel data, the line number of the line of pixel data, and the frame number of the image data from the memory according to the memory location in the reading indication information.

6. The device according to claim 1, wherein the receiver is further configured to:

determine the amount of pixel data contained in the line of pixel data;

determine whether the camera is abnormal according to the amount of pixel data and a numerical value for representing the amount of pixel data contained in each line of the image data for the size of the image data; and generate report information of camera abnormity and send the report information to the processor when the camera is determined to be abnormal;

the processor is further configured to send the received report information of camera abnormity to the server.

7. The device according to claim 6, wherein the receiver determines whether the camera is abnormal according to the amount of pixel data and the numerical value for representing the amount of pixel data contained in each line of the image data for the size of the image data, the receiver being further configured to:

calculate an absolute value of a difference between the amount of pixel data and the numerical value, and determine the camera is abnormal upon determining that the absolute value is higher than a preset numerical threshold; or calculate a ratio of the amount of pixel data to the numerical value, and determine the camera is abnormal upon determining that the ratio is higher than a first preset ratio threshold or the ratio is lower than a second preset ratio threshold.

8. The device according to claim 1, wherein the receiver receives image pixels in sequence, the receiver being further configured to:

when detecting a frame time sequence, sent by the camera, for representing start transmission of a current image data frame, detect a line time sequence, sent by the camera, for representing transmission of a current line of pixel data of the current image data frame;

when both the frame time sequence and the line time sequence are valid, receive the current line of pixel data of the current image data frame in sequence according to a time sequence of pixel data transmitted by the camera until confirming reception of the current line of pixel data when the line time sequence is invalid, and continue to detect a next line time sequence, sent by the camera, for representing start transmission of a next line of pixel data of the current image data frame; until confirming reception of the current image data frame when the frame time sequence is invalid, and detect a next frame time sequence, sent by the camera, for representing start transmission of a next image data frame.

9. The device according to claim 8, wherein the receiver receives the pixel data in the image data from the camera in sequence, the receiver further configured to:

increment a frame counter when detecting the frame time sequence sent by the camera;

increment a line counter when detecting the line time sequence sent by the camera; wherein the line counter is reset when detecting the next frame time sequence;

increment a pixel counter each time when receiving pixel data in the process of receiving the current line of pixel data of the image data in sequence according to the time sequences of the pixel data transmitted by the camera; wherein the pixel counter is reset when detecting the next line time sequence; and the receiver determines, upon reception of the line of pixel data, the line number of the line of pixel data in the image data, and the frame number of the image data, the receiver further configured to: determine, upon reception of the current line of pixel data, a count of the frame counter to be the frame number of the image data, and a count of the line counter to be the line number of the line of pixel data.

10. The device according to claim 1, wherein the receiver is further configured to:
delete the line of pixel data from the memory after the processor is configured to obtain the line of pixel data, the line number of the line of pixel data, and the frame number of the image data.

11. The device according to claim 1, wherein the receiver is a Field-Programmable Gate Array (FPGA).

12. The device according to claim 1, wherein the camera is a video camera.

13. A method comprising:
receiving, by a receiver, pixel data in image data from a camera in sequence and buffering the pixel data into a memory;
determining, upon reception of a line of pixel data, a line number of the line of pixel data in the image data and a frame number of the image data;
buffering correlatively, by use of the receiver, the line of pixel data, the line number of the line of pixel data, and the frame number of the image data into a preset location in the memory;
generate, upon reception of the line of pixel data, reading indication information that indicates that the line of pixel data is available to be read;
obtaining, by use of a processor, the line of pixel data, the line number of the line of pixel data, and the frame number of the image data from the receiver by obtaining the reading indication information, and reading the line of pixel data, the line number of the line of pixel data, and the frame number of the image data from the preset location of the memory according to the reading indication information; and
packaging, by use of the processor, the line of pixel data, the line number of the line of pixel data, and the frame number of the image data into a data packet, and transmitting the data packet to a server.

14. The method according to claim 13, wherein the receiver is a Field-Programmable Gate Array (FPGA).

15. The method according to claim 13, wherein the camera is a video camera.

16. The method according to claim 13, including:
sending, by use of the receiver, the reading indication information to the processor.

17. The method according to claim 13, including:
buffering, by use of the receiver, the reading indication information into the preset location in the memory; and
polling, by use of the processor, the preset location of the memory at a preset time cycle.

18. A non-transitory machine-useable storage medium embodying instructions which, when executed by a machine, cause the machine to:
receive, by a receiver, pixel data in image data from a camera in sequence and buffer the pixel data into a memory;
determine, upon reception of a line of pixel data, a line number of the line of pixel data in the image data and a frame number of the image data;
buffer correlatively, by use of the receiver, the line of pixel data, the line number of the line of pixel data, and the frame number of the image data into a preset location in the memory;
generate, by use of the receiver and upon reception of the line of pixel data, reading indication information that indicates that the line of pixel data is available to be read;
obtain, by use of a processor, the line of pixel data, the line number of the line of pixel data, and the frame number of the image data from the receiver by obtaining the reading indication information, and reading the line of pixel data, the line number of the line of pixel data, and the frame number of the image data from the preset location of the memory according to the reading indication information; and
package, by use of the processor, the line of pixel data, the line number of the line of pixel data, and the frame number of the image data into a data packet, and transmit the data packet to a server.

19. The method of claim 13, further comprising:
determining, by use of the receiver, the amount of pixel data contained in the line of pixel data;
determining, by use of the receiver, whether the camera is abnormal according to the amount of pixel data and a numerical value for representing the amount of pixel data contained in each line of the image data for the size of the image data;
generating, by use of the receiver, report information of camera abnormity and send the report information to the processor when the camera is determined to be abnormal;
sending, by use of the processor, the received report information of camera abnormity to the server.

20. The non-transitory machine-useable storage medium of claim 19, wherein the machine is further caused to:
determine, by use of the receiver, the amount of pixel data contained in the line of pixel data;
determine, by use of the receiver, whether the camera is abnormal according to the amount of pixel data and a numerical value for representing the amount of pixel data contained in each line of the image data for the size of the image data;
generate, by use of the receiver, report information of camera abnormity and send the report information to the processor when the camera is determined to be abnormal;
send, by use of the processor, the received report information of camera abnormity to the server.

* * * * *

UNITED STATES PATENT AND TRADEMARK OFFICE
CERTIFICATE OF CORRECTION

PATENT NO. : 10,771,726 B2
APPLICATION NO. : 15/932705
DATED : September 8, 2020
INVENTOR(S) : Ming Wang et al.

Page 1 of 1

It is certified that error appears in the above-identified patent and that said Letters Patent is hereby corrected as shown below:

In the Claims
In Column 14, Line 39, in Claim 20, delete "claim 19," and insert -- claim 18, --, therefor.

Signed and Sealed this
Fifth Day of January, 2021

Andrei Iancu
*Director of the United States Patent and Trademark Office*